US011859552B2

(12) United States Patent
Chukrallah

(10) Patent No.: US 11,859,552 B2
(45) Date of Patent: Jan. 2, 2024

(54) FLOW RECIRCULATIVE POWER SYSTEM

(71) Applicant: Raytheon Technologies Corporation, Farmington, CT (US)

(72) Inventor: Sami Chukrallah, West Palm Beach, FL (US)

(73) Assignee: RTX Corporation, Farmington, CT (US)

( * ) Notice: Subject to any disclaimer, the term of this patent is extended or adjusted under 35 U.S.C. 154(b) by 35 days.

(21) Appl. No.: 17/245,927

(22) Filed: Apr. 30, 2021

(65) Prior Publication Data
US 2022/0349317 A1 Nov. 3, 2022

(51) Int. Cl.
*F02C 7/22* (2006.01)
*F02C 9/38* (2006.01)
*F02C 7/232* (2006.01)

(52) U.S. Cl.
CPC .............. *F02C 7/222* (2013.01); *F02C 7/232* (2013.01); *F02C 9/38* (2013.01)

(58) Field of Classification Search
CPC .............. F01D 15/10; F05D 2260/205; F05D 2260/606; F02C 7/22; F02C 7/222; F02C 7/236; F02C 9/36; F02C 9/38; H02K 1/20; H02K 1/32; H02K 9/06; H02K 9/19
See application file for complete search history.

(56) References Cited

U.S. PATENT DOCUMENTS

| 5,156,001 | A | 10/1992 | Mouton | |
|---|---|---|---|---|
| 7,495,354 | B2 * | 2/2009 | Herrmann | F01D 15/10 290/52 |
| 10,161,108 | B2 | 12/2018 | Hijikata et al. | |
| 10,267,237 | B2 | 4/2019 | Pool et al. | |
| 2003/0038553 | A1 * | 2/2003 | Andres | F16C 32/047 310/90.5 |
| 2012/0324905 | A1 * | 12/2012 | Hagshenas | F02C 7/236 60/778 |
| 2014/0203760 | A1 * | 7/2014 | Lammers | B60W 20/00 320/162 |
| 2014/0250891 | A1 * | 9/2014 | Evans, Jr. | F02D 29/06 60/698 |
| 2015/0315971 | A1 * | 11/2015 | Reitz | B64C 1/38 60/39.461 |
| 2016/0053691 | A1 * | 2/2016 | Ernst | F02C 9/28 415/121.3 |
| 2020/0088098 | A1 * | 3/2020 | Roberge | F02C 7/143 |
| 2020/0232389 | A1 * | 7/2020 | Turney | F02C 7/185 |
| 2021/0075292 | A1 * | 3/2021 | Finke | F16D 11/16 |
| 2022/0021275 | A1 * | 1/2022 | Romero Perez | H02K 9/08 |
| 2022/0099299 | A1 * | 3/2022 | Carrotte | F02C 7/224 |

* cited by examiner

Primary Examiner — Ehud Gartenberg
Assistant Examiner — Henry Ng
(74) Attorney, Agent, or Firm — Bachman & LaPointe, P.C.

(57) ABSTRACT

A system includes a recirculation conduit that recirculates working fluid and a permanent magnet generator module in communication with the recirculation conduit. The working fluid from the recirculation conduit drives the permanent magnet generator module.

15 Claims, 3 Drawing Sheets

FLOW RECIRCULATIVE POWER SYSTEM

BACKGROUND

The present disclosure relates to electrical power generation, and more particularly to a system that generates power from recirculation of a working fluid.

Rotating electric machines are used for a wide variety of applications, such as aerospace, marine, industrial, automotive, and/or the like. A rotating electric machine may be an electric generator, wherein the relative rotation between a rotor and a stator converts mechanical energy to electrical energy. One example is an electric generator that is used onboard aircraft for supplying electrical power to the electrical system of the aircraft.

SUMMARY

A system according to one disclosed non-limiting embodiment of the present disclosure includes a recirculation conduit that recirculates a working fluid; and a permanent magnet generator module in communication with the recirculation conduit such that the working fluid from the recirculation conduit drives the permanent magnet generator module.

A further aspect of the present disclosure includes that the working fluid is a fuel being communicated to a combustor of a gas turbine engine.

A further aspect of the present disclosure includes that the recirculation conduit recirculates the working fluid back to a tank.

A further aspect of the present disclosure includes a pump to pump the working fluid to an engine, wherein the recirculation conduit recirculates an excess working fluid not communicated to the engine back upstream of the pump.

A further aspect of the present disclosure includes a servo valve downstream of the pump such that excess working fluid that is not passed through the servo valve is recirculated through the recirculation conduit.

A further aspect of the present disclosure includes a turbine driven by the working fluid from the recirculation conduit, the turbine operable to drive a rotor of the permanent magnet generator module in response to a flow of the working fluid flow.

A further aspect of the present disclosure includes an electrical distribution system in electrical communication with the permanent magnet generator module.

A further aspect of the present disclosure includes that the electrical distribution system comprises a battery.

A further aspect of the present disclosure includes that the permanent magnet generator module comprises a housing that receives a portion of the working fluid to provide thermal management of the permanent magnet generator module.

A permanent magnet generator module according to another disclosed non-limiting embodiment of the present disclosure includes a housing that contains a stator, a rotor, and a turbine, the housing in communication with a recirculation conduit such that a working fluid from the recirculation conduit drives the turbine which drives the rotor.

A further aspect of the present disclosure includes that the housing comprises an inlet in communication with the recirculation conduit and an outlet in communication with the recirculation conduit.

A further aspect of the present disclosure includes that the recirculation conduit from the outlet is in communication with a fuel tank.

A further aspect of the present disclosure includes that the recirculation conduit from the outlet is in communication with a fuel pump.

A further aspect of the present disclosure includes that the housing comprises a cooling path that receives a portion of the working fluid to provide thermal management of the permanent magnet generator module.

A method for generating electricity on-board a vehicle according to another disclosed non-limiting embodiment of the present disclosure includes driving a permanent magnet generator module with a working fluid from a recirculation conduit.

A further aspect of the present disclosure includes thermally managing the permanent magnet generator module with a portion of the working fluid.

A further aspect of the present disclosure includes that the working fluid is fuel.

A further aspect of the present disclosure includes that the working fluid from the recirculation conduit drives a turbine connected to a rotor of the permanent magnet generator module.

A further aspect of the present disclosure includes distributing electricity from the permanent magnet generator module to an electrical subsystem of the vehicle.

A further aspect of the present disclosure includes storing electricity from the permanent magnet generator module in an electrical subsystem.

The foregoing features and elements may be combined in various combinations without exclusivity, unless expressly indicated otherwise. These features and elements as well as the operation thereof will become more apparent in light of the following description and the accompanying drawings. It should be appreciated that however the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
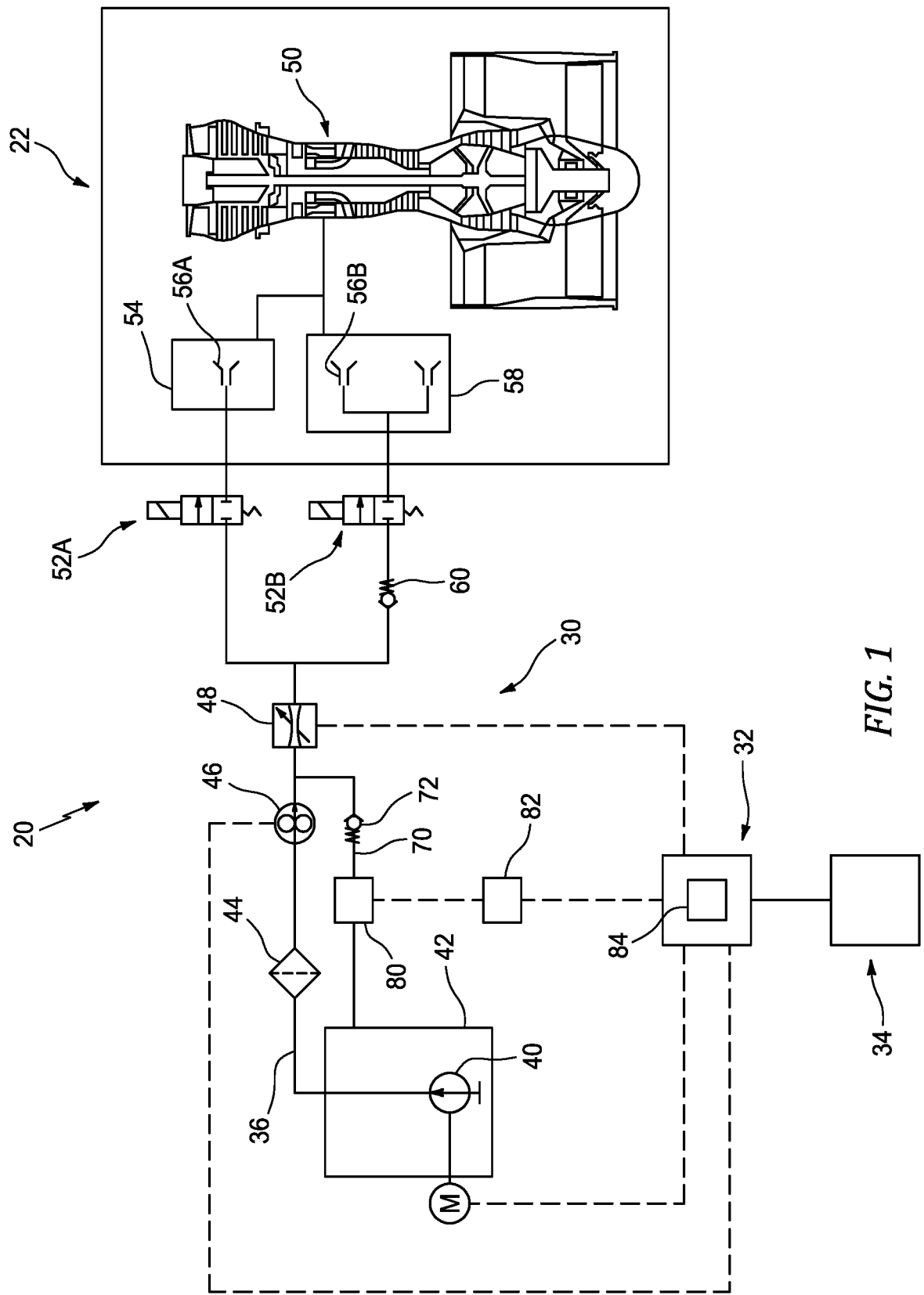
FIG. 1 is a schematic cross-section of a system for a gas turbine engine.

FIG. 1 schematically illustrates a system 20 for an engine 22. The engine 22 may be, for example, but not limited to, a gas turbine engine utilized for propulsion of an aircraft, a gas turbine engine utilized as an auxiliary power unit (APU) or other system.

The system 20 may include a working fluid subsystem 30, an electrical subsystem 32 and a control subsystem 34. Although primarily described with respect to a fuel system in the illustrated embodiment, the working fluid subsystem 30 may alternatively utilize a fluid, such as for example, fuel, hydraulic, pneumatic, etc. The system 20 may alternatively or additionally include various components such as multiple fuel tanks, air-oil coolers, fuel driven actuators, fuel modules, solenoid valves, metering valves, shut-off valves, spill valves, and other filters. It should be appreciated that various other systems, subsystems and components particular to the working fluid may alternatively or additionally be provided and are contemplated as included by the system 20.

The fluid subsystem 30 includes a supply conduit 36 in communication with a low pressure boost pump 40 located within a fuel tank 42. The supply conduit 36 may provide a fluid path through a filter system 44, a high pressure pump 46 downstream of the filter system 44, and a servo valve 48 downstream of the high pressure pump 46. The servo valve 48 may be controlled by the control subsystem 34 to set a desired fuel flow to a combustor section 50 of the engine 22 through the supply conduit 36.

Downstream of the servo valve 48, the working fluid, e.g., fuel, is communicated to the combustor section 50 of the engine 22 via solenoid valves, 52A, 52B that respectively control fuel into a primary manifold 54 with one or more injectors 56A that provides start flow to the engine 22 and to a secondary manifold 58 with one or more injectors 56B that provides the main flow to the engine 22. A flow divider 60 may be utilized to facilitate flow control between the manifolds.

Downstream of the high pressure pump 46 but upstream of the servo valve 48, a recirculation conduit 70 communicates excess working fluid, e.g., fuel that is not communicated through the servo valve 48 to the combustor section 50 of the engine 22 is recirculated back to the fuel tank 42. Fuel supply pumps are typically sized to provide fuel flow for peak power conditions with some additional margin. Under other operating conditions, the fuel supply pumps may supply significantly more fuel than required by the combustor section 50 and the excess flow is recirculated. Peak power is usually required on takeoff for turbofan main engines. For Auxiliary Power Units (APUs) peak power demand is typically during main engine start, or a combined operating condition where bleed air is required for an aircraft environmental control system or start system, and a generator load for electrical power.

As an example, an APU at idle, 100% speed, no load, could operate at about 40 pounds per hour fuel consumption. Under max load, the APU may require up to 400 pounds per hour fuel consumption, an order of magnitude (10:1) more fuel. Gearbox driven mechanical pumps are always supplying that 400 pounds per hour fuel at 100% speed, independent of engine load conditions. Typically, a metering device (e.g., a servo valve) that is engine controller driven will only provide the fuel flow needed to maintain engine speed at 100% while providing the necessary load. So in the example of the APU at idle, 360 pounds per hour of fuel flow would be recirculated. At partial and full loads, some lesser quantity of fuel flow would be recirculated. All scenarios that represent some level of lost energy that may be recuperated.

Figure 2:
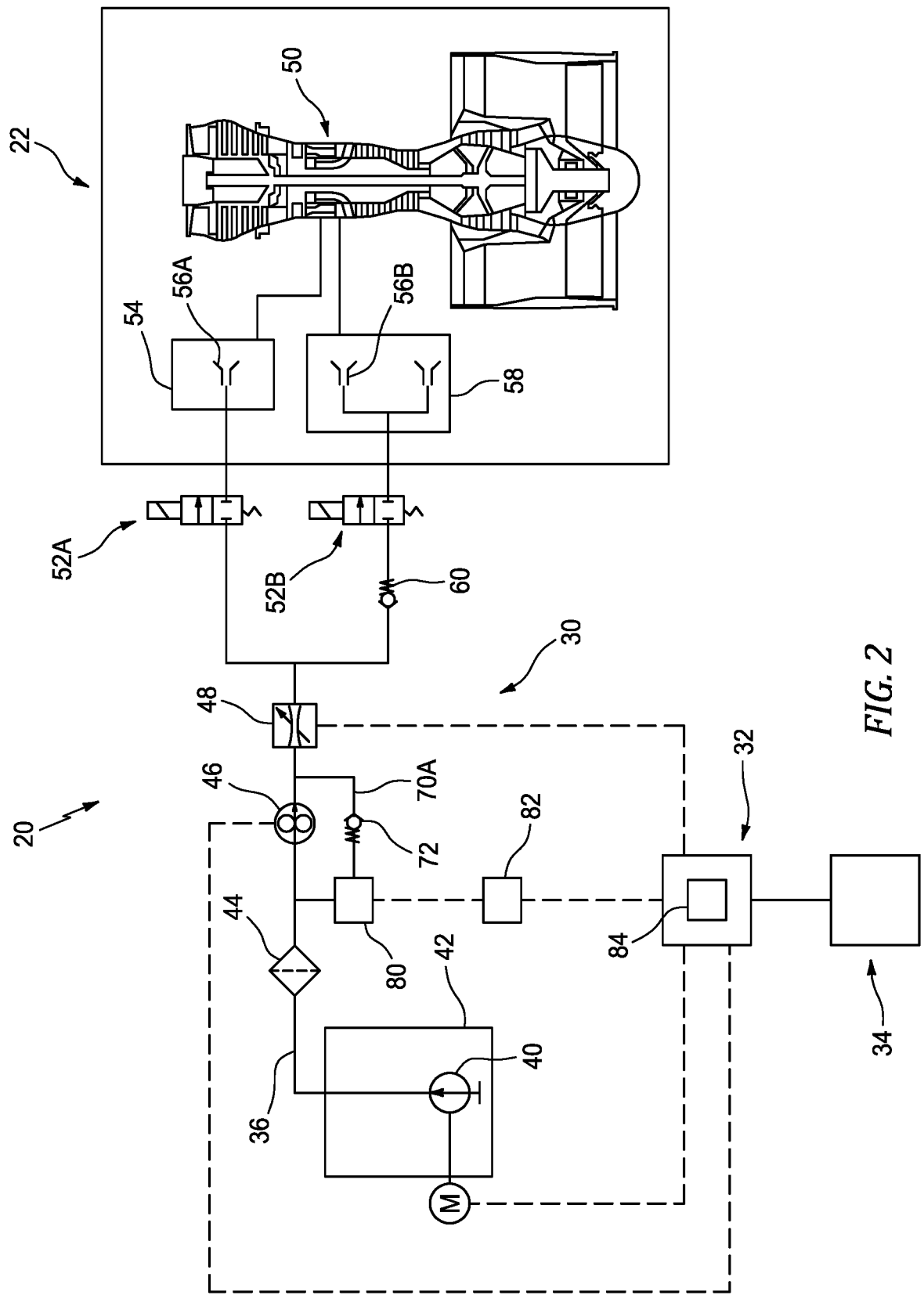
FIG. 2 is a schematic cross-section of a system for a gas turbine engine according to an alternative embodiment.

A pressure relief valve 72 may be located in the recirculation conduit 70. Alternatively, the recirculation conduit 70A may communicate excess working fluid upstream of the high pressure pump 46 (FIG. 2). Downstream of the pressure relief valve 72, but upstream of the fuel tank 40, a permanent magnet generator module 80 is located within the recirculation conduit 70 and is thereby driven by the working fluid. Due to the change in engine load conditions and the resultant recirculation flow variation, the permanent magnet generator module 80 will provide variable output voltage such that a voltage regulator 82 or other system may complement the permanent magnet generator module 80 as part of the electrical subsystem 32.

The permanent magnet generator module 80 may provide the generated power to an electrical distribution system 84 such as a battery, distribution bus, engine auxiliaries requiring electrical power, or other such system. Alternatively, or in addition, the power may be routed through transformers, rectifiers or inverters to change the voltage or type of current. Individual components and systems may be powered from the bus with circuit protection in the form of a circuit breaker. The battery system may be used for engine start and as an emergency source of power in the event of a generation or distribution system failure. The electrical distribution system 84 may also be utilized with a hybrid electric engine system. The generated power may be distributed, stored, and/or controlled through the control subsystem 34.

Figure 3:
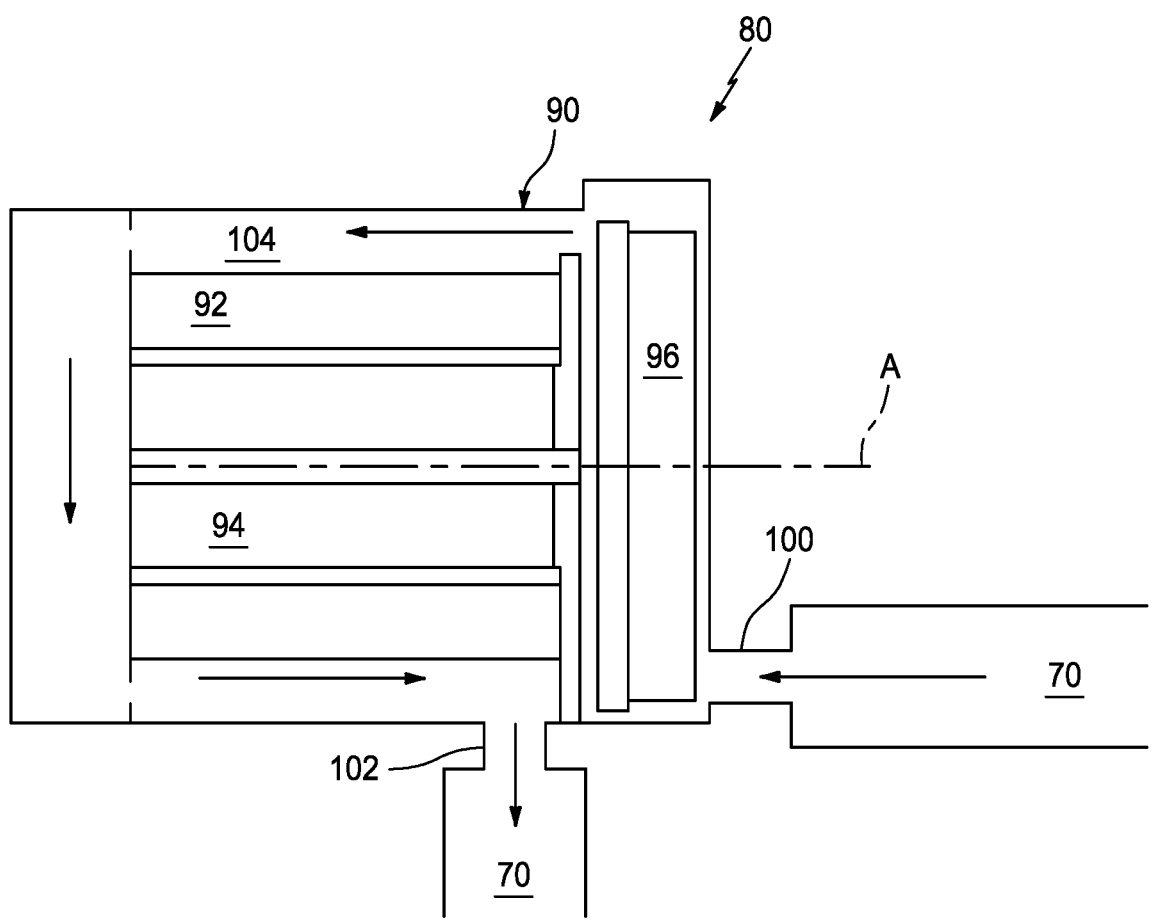
FIG. 3 is an enlarged sectional view of a permanent magnet generator module.

With reference to FIG. 3, the permanent magnet generator module 80 includes a housing 90, a stator 92, a rotor 94, and a turbine 96 mounted to the rotor 94 along an axis A. The turbine 96 may be of various configurations to include, for example, gears, screws, etc. The turbine 96 may be at least partially located in the housing 90.

The turbine 96 communicates with the working fluid though the recirculation conduit 70 that is connected to the permanent magnet generator module 80 via an inlet 100 and an outlet 102. The recirculation conduit 70 is in communication with the permanent magnet generator module 80 via the inlet 100 and the outlet 102. The turbine 96 is thereby rotated by the working fluid from the recirculation conduit 70 to power the permanent magnet generator module 80.

The housing 90 may also include a cooling path 104 for the working fluid. The cooling path 104 circulates the working fluid to facilitate thermal control of the permanent magnet generator module 80.

Although the different non-limiting embodiments have specific illustrated components, the embodiments are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A system, comprising:
  a recirculation conduit that recirculates a working fluid, wherein the working fluid is a fuel being communicated to a combustor of a gas turbine engine; and
  a permanent magnet generator in communication with the recirculation conduit such that the working fluid from the recirculation conduit drives the permanent magnet generator, wherein the permanent magnet generator comprises a turbine and a housing that contains the turbine and receives a portion of the working fluid from the recirculation conduit such that the working fluid drives the turbine, the working fluid thermally coupled to the permanent magnet generator through a cooling path formed within the housing, the working fluid configured to circulate through the cooling path providing thermal management of the permanent magnet generator.

2. The system as recited in claim 1, wherein the recirculation conduit recirculates the working fluid back to a tank.

3. The system as recited in claim 1, further comprising a pump to pump the working fluid to the gas turbine engine, wherein the recirculation conduit recirculates an excess working fluid not communicated to the gas turbine engine back upstream of the pump.

4. The system as recited in claim 3, further comprising a servo valve downstream of the pump such that excess working fluid that is not passed through the servo valve is recirculated through the recirculation conduit.

5. The system as recited in claim 1, wherein the turbine is operable to drive a rotor of the permanent magnet generator in response to a flow of the working fluid.

6. The system as recited in claim 1, further comprising an electrical distribution system in electrical communication with the permanent magnet generator.

7. The system as recited in claim 6, wherein the electrical distribution system comprises a battery.

8. A permanent magnet generator, comprising:
a stator;
a rotor which rotates with respect to the stator;
a turbine connected to the rotor; and
a housing that contains the stator, the rotor, and the turbine, the housing in communication with a recirculation conduit such that a working fluid from the recirculation conduit drives the turbine which drives the rotor, wherein the working fluid is fuel; and
the permanent magnet generator in communication with the recirculation conduit such that the working fluid from the recirculation conduit drives the permanent magnet generator, the working fluid thermally coupled to the permanent magnet generator through a cooling path formed within the housing, the cooling path formed within the housing configured to circulate the working fluid through the cooling path providing thermal management of the permanent magnet generator.

9. The permanent magnet generator as recited in claim 8, wherein the housing comprises an inlet in communication with the recirculation conduit and an outlet in communication with the recirculation conduit.

10. The permanent magnet generator as recited in claim 9, wherein the recirculation conduit from the outlet is in communication with a fuel tank.

11. The permanent magnet module as recited in claim 9, wherein the recirculation conduit from the outlet is in communication with a fuel pump.

12. The permanent magnet generator as recited in claim 9, wherein the housing comprises the cooling path that receives a portion of the working fluid to provide thermal management of the permanent magnet generator.

13. A method for generating electricity on-board a vehicle, comprising:
driving a permanent magnet generator with a working fluid from a recirculation conduit, wherein the working fluid is fuel;
thermally managing the permanent magnet generator with a portion of the working fluid, wherein the working fluid from the recirculation conduit drives a turbine connected to a rotor of the permanent magnet generator;
thermally coupling the working fluid to the permanent magnet generator through a cooling path within a housing of the permanent magnet generator, wherein the housing contains the turbine; and
circulating the working fluid through the cooling path to provide the thermal management of the permanent magnet generator.

14. The method as recited in claim 13, further comprising distributing electricity from the permanent magnet generator to an electrical subsystem of the vehicle.

15. The method as recited in claim 13, further comprising storing electricity from the permanent magnet generator in an electrical subsystem.

* * * * *